United States Patent [19]

Farleigh

[11] Patent Number: 4,557,501
[45] Date of Patent: Dec. 10, 1985

[54] METHOD AND APPARATUS FOR IMPROVING DIRECTIONAL STABILITY OF MOTOR VEHICLES

[76] Inventor: James R. Farleigh, 728 N. Fifth Ave., Redmond, Oreg. 97756

[21] Appl. No.: 634,683

[22] Filed: Jul. 24, 1984

[51] Int. Cl.$^4$ .............................................. B60G 7/02
[52] U.S. Cl. .................................. 280/673; 267/21 R; 267/63 R; 267/153
[58] Field of Search ...................... 280/96.1, 671, 673, 280/662, 697, 715; 267/21 R, 63 R, 152, 153

[56] References Cited

U.S. PATENT DOCUMENTS

| | | | |
|---|---|---|---|
| 2,226,027 | 12/1940 | Stoner | 172/677 |
| 3,139,275 | 6/1964 | Burkitt | 267/20 R |
| 3,178,202 | 4/1965 | Kozicki | 280/696 |
| 3,333,653 | 8/1967 | Eirhart, Jr. | 180/73.1 |
| 4,252,339 | 2/1981 | Shimizu et al. | 280/673 |

Primary Examiner—Joseph F. Peters, Jr.
Assistant Examiner—Kenneth R. Rice
Attorney, Agent, or Firm—Chernoff, Vilhauer, McClung, Birdwell & Stenzel

[57] ABSTRACT

A method for improving the stability of steering of a motor vehicle equipped with radius members resiliently attached at one end thereof to the frame or body of a vehicle and at another end thereof to a vertically movable part of a suspension assembly of the vehicle, and a device for use according to the method. A flexible spacer of material such as laminated cloth impregnated with a tough rubber-like material is placed between a bushing surrounding a radius member and a restraining device holding the bushing on a radius member, permitting the bushing to be compressed axially along the radius member, thus reducing the amount of freedom of motion of the radius member in a direction generally longitudinal of the vehicle, without the necessity to remove and replace the entire bushing with a new one. The flexible spacer is ordinarily of an annular flat washer shape permitting the bushing to be compressed axially by the fasteners normally used to hold the bushings in place at the point of attachment of an end of a radius member to the body or frame of the motor vehicle.

11 Claims, 5 Drawing Figures

METHOD AND APPARATUS FOR IMPROVING DIRECTIONAL STABILITY OF MOTOR VEHICLES

BACKGROUND OF THE INVENTION

The present invention relates to directional stability of motor vehicles, and particularly to a method for modifying the resilient attachment of radius arms and strut rods of motor vehicle suspension assemblies to the frames or bodies of such motor vehicles.

Motor vehicle front suspension assemblies of several general types include either radius arms or strut rods which extend in a generally longitudinal direction or diagonally inwardly from a vertically movable portion such as a lower control arm or an axle on each side of the vehicle to an attachment point on the frame or body of the vehicle. Such radius arms or strut rods are intended to limit the amount of motion of the movable portion of the suspension assembly in a direction generally longitudinal of the vehicle. This is required in order to prevent the steerable wheel on one side from being deflected rearwardly relative to the body of the vehicle, thus swinging both wheels toward that side, when a steerable wheel on that side of the vehicle encounters an obstruction such as a stone or a pothole which momentarily obstructs forward movement of the wheel.

While a radius arm or strut rod, hereinafter called a radius member, might be attached to the frame of a vehicle by a universal joint or a ball joint, such a connection would be expensive to manufacture and would transmit, undamped, the shocks and impulses caused by unevenness encountered in the roadway or off-road terrain being traversed by the vehicle. Additionally, some freedom of motion of the radius member is usually required in a direction longitudinal of the vehicle because of other limitations on the motion of the portion of the suspension to which the radius member is fixedly attached.

In order to provide the desired freedom of motion of the end of a radius member which is attached to the frame or body of a vehicle, it has become customary to mount the end of the radius arm or strut rod in a flexible resilient bushing held by a mounting bracket attached fixedly to the frame or body of the vehicle. Such a resilient connection also isolates the frame and body of the vehicle from the shocks which would otherwise be transmitted through the radius member, and which would then cause an undesirable amount of vibration and resulting fatigue of the occupants of the vehicle.

For operation of a motor vehicle on rough terrain, however, the bushings ordinarily used for attaching a radius arm or strut rod to the vehicle frame or body are frequently too elastic.

The resilient bushings normally provided make it possible for a bump or pothole to move a wheel encountering such an obstacle rearward, together with the control arms or axle supporting the wheel, causing the vehicle to steer toward the side on which such an obstacle is encountered. This condition requires an opposing steering correction by the vehicle's driver, and is at least tiring, if not dangerous, when operating such a vehicle on rough surfaces such as poorly maintained roads or unpaved terrain.

When the bushings attaching a radius member to a vehicle frame become deteriorated they no longer restore the strut rod or radius arm to the correct position after obstacles have been encountered, and eventually the need to realign the suspension assemblies results. Furthermore, such deterioration exaggerates the tendency of many vehicles to be susceptible to unevenness of the road surface.

In some cases deteriorated or undesirably soft or loose radius member bushings can be improved by adjusting a nut used to hold the bushings on a radius arm or strut rod to achieve the desired tightness. For example, Eirhart, Jr., U.S. Pat. No. 3,333,653 and Burkitt, U.S. Pat. No. 3,139,275 teach the use of tightenable nuts to increase the amount of compression on bushings used in this portion of a vehicle suspension assembly to achieve the desired result.

In many motor vehicle suspension assemblies, however, bushings are not adjustably mounted. Furthermore, a metal or other hard spacer cannot be used in conjunction with the ordinary bushings in such a location, because it would be likely to cause unacceptable damage to the soft material of which such bushings are made.

If tightening the bushings is not possible, then the previously available way to improve such a situation is to replace a deteriorated bushing, or to replace original equipment bushings which are too soft with ones of less compressible material, in order to provide a stiffer connection between a radius arm and the vehicle's frame. Either of these procedures is quite expensive because of the amount of labor involved.

As shown in Shimizu et al., U.S. Pat. No. 4,252,339, it is known to control the spring constant of a bushing used for such attachment of a radius arm or strut rod by constructing the bushing of rubber including various numbers of layers of canvas fabric within the bushing in order to limit the elasticity and compressibility of the bushing, while providing the desired amount of freedom of movement of the radius arm or strut rod in its mounting on the frame of the vehicle. Shimizu, et al., however, does not teach how to correct the condition in which a vehicle is originally equipped with bushings which are too compressible, without substantial disassembly of the suspension assemblies and replacement of the bushings with those of the type taught in the Shimizu et al. patent.

Normally, replacement of radius member bushings requires disassembly of a large portion of the involved suspension assembly in order to permit the radius arm or strut rod to be withdrawn from its mounting bracket fixedly located on the vehicle's frame. Thus, while the Shimizu, et al. patent teaches installation of bushings which might improve the condition in which steering stability of a vehicle is excessively affected by rough road surfaces, it does not teach how to accomplish this improvement without undesirably high labor costs.

Additionally, replacement of an originally all-rubber bushing with one made of a harder material such as a polytetrafluoroethylene plastic, as has previously been done, is likely to result in too rigid a connection.

What is needed, therefore, is a method and device for correcting or improving the ability of a vehicle to remain directionally stable despite operation on rough surfaces, without the expense of suspension system disassembly and replacement of the bushings used to mount an end of a radius arm or strut rod to the frame of a vehicle.

SUMMARY OF THE INVENTION

The present invention overcomes the shortcomings of the previously available methods and devices for correcting the tendency of a vehicle to steer toward an obstacle encountered by steerable wheels on one side of the vehicle, by providing a flexible spacer which can be used along with the bushings ordinarily connecting movable radius members of a suspension system to the vehicle's frame. Addition of such a spacer limits forward and rearward movement of intentionally vertically movable portions of the suspension assembly relative to the frame and body of the vehicle and isolates the frame and body of a vehicle from vibration transmitted through the radius arms or strut rods. In accordance with the present invention, a resilient, flexible, but only slightly compressible spacer in the form of a flat washer is installed adjacent a bushing to facilitate compressing the originally installed bushings axially so as to increase opposition of the bushing to axial movement of the radius arm or strut rod relative to its mounting bracket, without removing the bushings from their original locations. Addition of such a spacer allows axial compression of the bushings even in the case where the bushings are normally retained by retainer washers or the like which are limited in their ability to move relative to the radius arm or strut rod.

Preferably, such a spacer is made of a material which is only slightly compressible and which is flexible enough and soft enough not to cut the material of which the original bushing is made. For example, laminated canvas or similar strong heavy fabric impregnated with rubber, similar to the material used for flat belting for conveyor machinery, has been found to be usable for this application.

In accordance with the method of the invention, a spacer of such material in the form of an annular flat washer is installed by removing retaining nuts and retaining washers or cups from the end of a radius arm or strut rod, hereinafter called a radius member, at the location where it is attached to the vehicle frame. The spacer of the invention is then installed on the thus-exposed end of the radius member, the retaining washers and nuts or other fasteners are replaced and the fasteners are tightened to return any retaining washer or cup to a position approaching that previously occupied, thus compressing the bushings to a greater extent than possible without the flexible spacer. The additional compression of the bushings thus obtained prestresses the bushings, particularly in the axial direction along the radius arm or strut rod, thus limiting the freedom of movement of the radius arm or strut rod longitudinally of the vehicle to an amount less than that previously available through compression of the bushings.

Since the amount of axial movement of the radius arm or strut rod as a response to a particular amount of force exerted in an axial direction is reduced, deflection of the steerable wheels of a vehicle is reduced and the directional stability of the vehicle is improved.

Therefore, it is principal object of the present invention to provide a method for improving the directional stability of a motor vehicle.

It is another important object of the present invention to provide a spacer which can be installed along with bushings used in the attachment of a radius member to the frame or body of a motor vehicle, without damaging the original bushings.

It is an important feature of the present invention that it provides a method of correcting excessive freedom of movement of a radius arm or strut rod of a vehicle suspension system by adding a flexible spacer to a radius member bushing without the cost of major disassembly of the suspension assemblies involved.

It is another feature of the present invention that it provides a spacer which is both flexible and slightly compressible, for installation on a radius member, adjacent a bushing used to attach the radius member to the frame of a motor vehicle.

It is an important advantage of the present invention that it provides a method which is less expensive than that previously available for improving the directional stability of a motor vehicle expected to be operated on rough terrain or roadways.

The foregoing and other objectives, features and advantages of the present invention will be more readily understood upon consideration of the following detailed description of the invention taken in conjunction with the accompanying drawings.

DETAILED DESCRIPTION OF THE INVENTION

Figure 1:
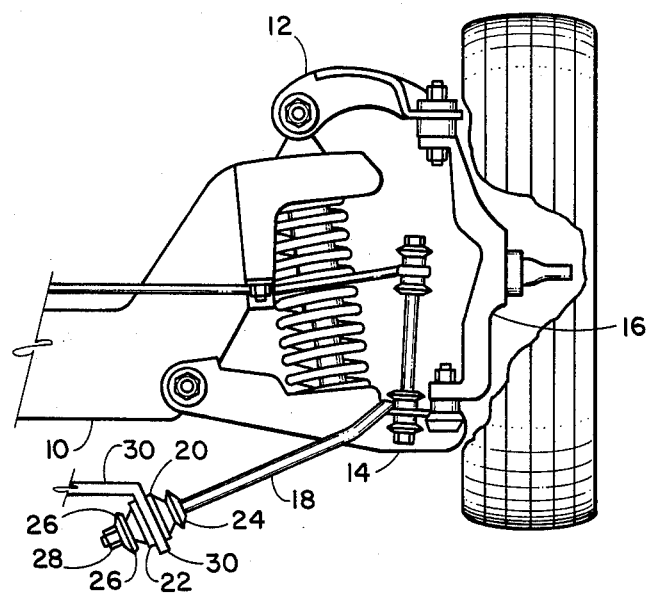
FIG. 1 is a front elevational view of a portion of a conventional front end suspension for a vehicle including a strut rod connected with a lower control arm and equipped with bushings as in the prior art.

Referring now to the drawings, FIG. 1 shows a portion of a conventional front end suspension system for a motor vehicle, including a main transverse member 10, an upper control arm 12, a lower control arm 14, and a steering knuckle 16 connected to the upper and lower control arms 12 and 14 by respective ball joints.

A strut rod 18 has one end fixedly connected to the lower control arm 14, and extends forwardly from the lower control arm 14. At the opposite, or forward, end of the strut rod 18 in a suspension system of this type, according to the prior art, a strut rod bushing consisting of an inner portion 20 and an outer portion 22 is mounted between metal retainers 24 and 26 held in place on the strut rod 18 by a nut 28.

Normally, such a strut rod 18 extends diagonally forward and inward from the lower control arm 14 toward a longitudinal frame member (not shown) of a vehicle. The strut rod bushing portions 20 and 22 are located on opposite sides of a mounting bracket 30 attached to the frame of the vehicle in such a way as to control forward and rearward movement of the lower control arm 14, with the strut rod 18 extending through a hole in the bracket 30, but being isolated from direct contact by the bushing. Preferably, some movement of the strut rod 18 in an axial direction through the mounting bracket 30, as well as some rotational and pivotal angular movement, is permitted by flexure and compression of the strut bushing portions 20 and 22. However, the amount of movement in a direction longitudinal of the vehicle permitted by the strut rod bushing portions 20 and 22 may be more than is desirable in operating the vehicle on rough roads or over unpaved terrain.

Figure 2:
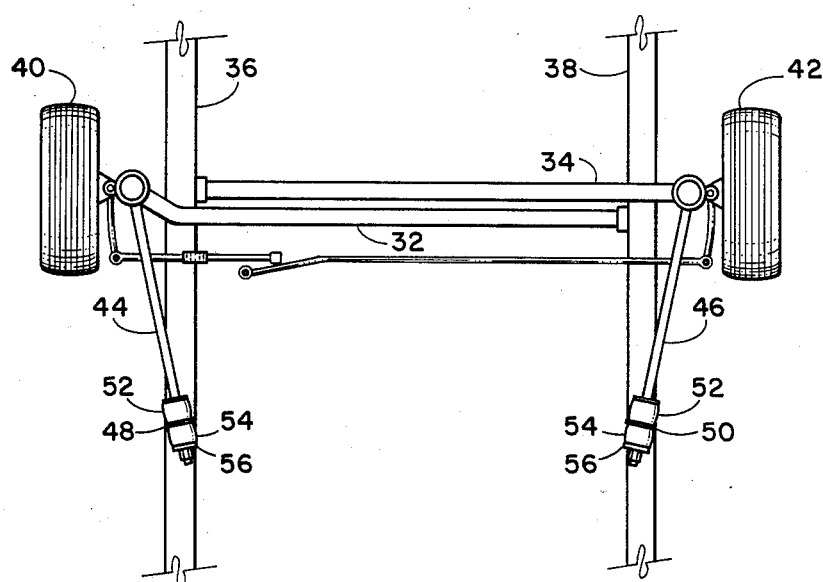
FIG. 2 is a top plan view of a typical light truck front suspension assembly including a radius arm equipped with bushings and to which a flexible spacer embodying the present invention has been added.

Referring now to FIG. 2, a front end suspension of a type commonly used in light trucks includes a pair of independently mounted swing axles 32 and 34, connected pivotably to respective longitudinal frame members 38 and 36. The axles 32 and 34 are thus able to pivot in vertical planes, about horizontal axes extending longitudinally of the vehicle, to permit the respective wheels 40 and 42 to move in a generally vertical direction relative to the frame members 36 and 38 to accommodate unevenness of the surface on which a vehicle having this suspension system is operated.

A pair of radius arms 44 and 46 extend rearwardly from the axles 32 and 34, respectively, and are attached to the frame members 36 and 38 through respective mounting brackets 48 and 50. The attachment of each of the radius arms 44 and 46 to the respective mounting bracket 48 or 50 includes a pair of bushings each including a forward or inner bushing section 52 and a rear, or outer, bushing section 54, together with a flexible spacer 56.

Figure 3:
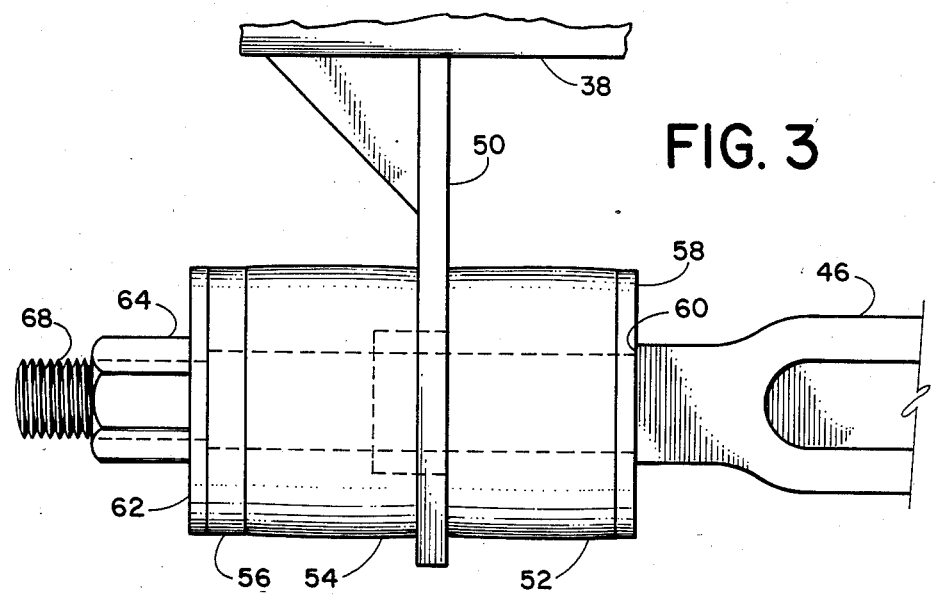
FIG. 3 is a side elevational view of a portion of one of the radius arms shown in FIG. 2, showing the radius arm bushings and the flexible spacer at an enlarged scale.

The arrangement of the mounting bracket 50 and bushing sections 52 and 54 with respect to the radius arm 46 is shown in greater detail in FIG. 3. As may be seen, a forward, or inner, retaining washer 58 rests against a shoulder 60 on the radius arm 46 and limits forward movement of the inner bushing 52. A rear retaining washer 62 and a nut 64 limit forward motion of the radius arm 46 with respect to the mounting bracket 50.

Figure 4:
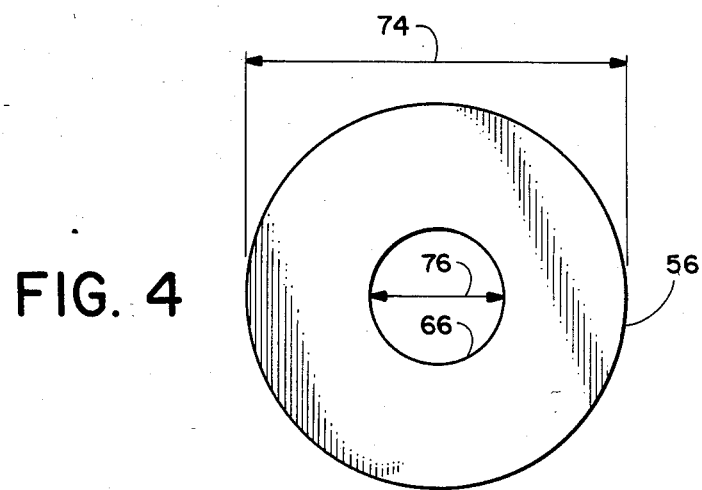
FIG. 4 is an end view of the flexible spacer shown in FIG. 2, at an enlarged scale.
Figure 5:
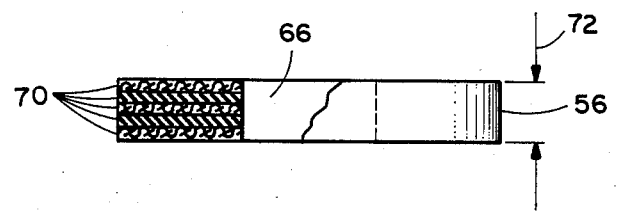
FIG. 5 is a partially cut away side view of the flexible spacer shown in FIG. 4.

As shown in FIGS. 4 and 5, the flexible spacer 56 is made, for example, of cloth fabric, in multiple layers 70, impregnated and held together by a flexible, resiliently elastic, rubber-like material bonding the several layers 70 of cloth to one another securely, but allowing some flexibility and compressibility, although providing less flexibility and compressibility than the solid rubber of a radius member bushing 54. The flexible spacer 56 is, therefore, capable of compressing the bushing 54 without being so hard that it cuts it. The cloth layers 70 may, for example, be of a heavy canvas-like cloth woven of nylon, impregnated with a synthetic rubber. Such material is available in sheet form for use as flat conveyor belt material from which the spacer 56 may be cut in the required size. Such material is available in thicknesses of, for example, ¼ inch and ⅜ inch. It has been found acceptable to use a flexible spacer 56 having a thickness 72 of about ¼ inch and including four plies, to accomplish the purpose of the invention.

The flexible spacer 56 defines a central opening 66 large enough to pass over the rear end 68 of the radius arm 46. An outer diameter 74 and a diameter 76 of the central opening 66 are determined by the size of the radius arm, and of the original equipment bushings such as the bushing sections 52 and 54 in a particular vehicle with which the present invention is intended to be used.

In accordance with the method of the present invention, in order to correct a condition in which the suspension members carrying the steerable wheels of a motor vehicle have too much freedom of motion longitudinally of the vehicle, and in which operation of the motor vehicle on uneven surfaces causes the steerable wheels to turn toward obstructions encountered by one of the wheels of the vehicle, the fasteners and retainer cups or washers holding the outer portion of a radius arm bushing 54 (or the outer portion 22 of a strut rod bushing, in the case of the type of suspension shown in FIG. 1) are removed from only the outer end 68 of the radius arm 46 (or, correspondingly, the nut 28 and retainer 22 are removed from the outer end of a strut rod 18). A flexible shim or spacer such as the flexible spacer 56 is then placed over the exposed outer end of the radius arm 46 or strut rod 18, after which the retaining washers 62 and nut 64 (or retainer 26 and nut 28) are replaced. The nut 64 is then tightened to return it to, or nearly to, its original position on the threaded outer portion 68.

The procedure explained above compresses both the inner portion 52 and outer portion 54 of the radius arm bushing, and to some extent may draw the axle 34 rearward with respect to the frame member 38 on a vehicle having a suspension system such as that shown in FIG. 2. For that reason, once the above procedure has been accomplished it is advisable to realign the wheels of the vehicle to proper specifications to avoid excessive tire wear.

The result of adding the flexible spacer 56 to the radius arm 46 or control arm strut rod 18 is to increase the spring constant of the attachment above that previously available in the bushings, so that a larger amount of force, or what is equivalent, a larger hole or bump on the surface being traversed by a vehicle, is required to deflect a control arm or axle of the vehicle rearward. In effect, then, the suspension is tightened by the addition of the flexible spacer 56 within the same distance axially along a radius member which was previously occupied by only the bushings by which a radius arm or strut rod is isolated from its mounting bracket on the frame of the vehicle. It will be appreciated that this method is not limited in its application to the types of suspension systems illustrated herein, but also to most other suspension systems including a resilient attachment of a longitudinally-effective bracing member for controlling longitudinal movement of a wheel-carrying member of a suspension assembly relative to a body of a vehicle.

While a suspension system can be restored only to its original condition by complete replacement of a badly deteriorated radius arm bushing or strut rod bushing, the addition of the flexible spacer 56 provides greater stiffness and lesser freedom of axial motion of a radius member such as the radius arm 46 or strut rod 18 than is available with new bushings of the original equipment type. Thus, the method of the invention requires much less labor and time than is required to accomplish a complete removal and replacement of original equipment or deteriorated bushings, yet eliminates excessive freedom of rearward motion of an axle or control arm to provide better steering stability than can be obtained with new bushings of the original type.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method for improving the steering stability of a motor vehicle, comprising:

increasing the rigidity of support provided by a resilient radius member bushing included in a mounting for a radius member of a suspension assembly of such a motor vehicle, by placing a flexible spacer including a plurality of parallel layers of cloth, impregnated with and held together by a resilient, rubber-like material, in the space normally occupied by said radius member bushing, in addition to the radius member bushing, so as to increase the amount of force required to move said radius member in a generally longitudinal direction relative to said motor vehicle.

2. The method of claim 1, including the further step of selecting said flexible spacer to be less compressible than said radius member bushing.

3. A method for reducing the amount of axial freedom of movement of a radius member of a vehicle suspension system in which said radius member is mounted using a resilient radius member bushing, comprising:
 (a) mounting a resiliently flexible spacer which is less compressible than said radius member bushing on said radius member adjacent said radius member bushing; and
 (b) retaining said spacer and said bushing under pressure compressing said bushing within a distance, axially along said radius member, smaller than that previously occupied by said bushing.

4. The method of claim 3, including the further step of providing said flexible spacer in the form of a plurality of parallel layers of cloth impregnated with and held together by a resiliently flexible material.

5. A method for reducing the amount of axial freedom of movement of a radius member of a vehicle suspension system in which said radius member is mounted using first and second resilient radius member bushings located on both sides of an attachment bracket on said vehicle, said method comprising:
 (a) removing an installed fastener from a position on said radius member adjacent an outer side of the first one of said bushings:
 (b) placing a flexible spacer immediately adjacent said first one of said bushings;
 (c) thereafter replacing said fastener on said radius member; and
 (d) tightening said fastener with said spacer adjacent said first one of said bushings and thereby compressing both of said bushings in the direction axially along said radius member until said bushings both occupy less distance along said radius member in said axial direction than before removal of said fastener.

6. The method of claim 5, including the further step of selecting said flexible spacer to be less compressible than said first and second bushings.

7. In combination with a vehicle suspension assembly including a radius member oriented generally longitudinally of a vehicle and extending from a portion of said suspension assembly, which moves vertically substantially in direct relationship with vertical movement of a wheel located on said vehicle suspension assembly, toward an attachment bracket located on said vehicle, said radius member normally being connected with said attachment bracket by extending through an opening in said attachment bracket and being cushioned from direct contact with said attachment bracket by a resilient radius member bushing, said radius member bushing surrounding a portion of said radius member and being retained by a bushing retaining member, a device for reducing the amount of movement of said radius member relative to said attachment bracket in a direction resulting from movement of said wheel relative to said attachment bracket, comprising a resiliently flexible annular spacer located on said radius member, between said bushing retaining member and said attachment bracket, in compressing abutment with said radius member bushing, said resiliently flexible annular spacer being less compressible than said bushing.

8. The device of claim 7, wherein said resiliently flexible annular spacer is made of a material including a plurality of substantially parallel layers of cloth impregnated with and connected to one another by a resilient rubber-like material.

9. The device of claim 7, wherein said thickness of said flexible annular spacer is about $\frac{1}{4}$ inch.

10. In combination with a vehicle suspension assembly including a radius member oriented generally longitudinally of a vehicle and extending from a portion of said suspension assembly, which moves vertically substantially in direct relationship with vertical movement of a wheel located on said vehicle suspension assembly, toward an attachment bracket located on said vehicle, said radius member normally being connected with said attachment bracket by extending through an opening in said attachment bracket and being cushioned from direct contact with said attachment bracket by first and second resilient radius member bushings located on both sides of said bracket, said radius member bushings surrounding a portion of said radius member and being retained by a pair of bushing retaining members, a device for reducing the amount of movement, of said radius member relative to said attachment bracket, permitted by the second bushing in a direction resulting from movement of said wheel relative to said attachment bracket, comprising a resiliently flexible annular spacer located on said radius member between one of said bushing retaining members and said attachment bracket, in abutment with the first bushing, compressing both said first bushing and said second bushing.

11. The apparatus of claim 10 wherein said resiliently flexible annular spacer is less compressible than said first and second bushings.

* * * * *